United States Patent

[11] 3,621,099

| [72] | Inventors | Charles R. Jacobson, deceased<br>late of 9 Cottage Ave., Orange, N.J. 02194<br>by Annie T. Jacobson, heir;<br>Anthony D'Adamo, 17 Dillon Ave., West<br>Caldwell, N.J. 07006; Charlotte E.<br>Cosgrove, 30 Maple Ave., West Orange,<br>N.J. 07052 |
|---|---|---|
| [21] | Appl. No. | 805,121 |
| [22] | Filed | Mar. 5, 1969 |
| [45] | Patented | Nov. 16, 1971<br>Continuation of application Ser. No.<br>742,994, June 17, 1958, now abandoned.<br>This application Mar. 5, 1969, Ser. No.<br>805,121 |

[54] THERAPEUTIC COMPOSITIONS AND METHODS FOR STIMULATING THE CENTRAL NERVOUS SYSTEM
10 Claims, No Drawings

[52] U.S. Cl............................................................ 424/269, 260/308
[51] Int. Cl............................................................ A61k 27/00
[50] Field of Search.............................................. 742/994; 260/308; 424/269

[56] References Cited
UNITED STATES PATENTS
2,944,060  7/1960  Close et al. ................... 260/308

*Primary Examiner*—Stanley J. Friedman
*Attorney*—McClure, Weiser and Millman

ABSTRACT: Pharmaceutical compositions which are stimulating and which contain a pharmaceutical excipient and an alkyl-substituted urazole. The process of causing stimulation by administering the composition.

THERAPEUTIC COMPOSITIONS AND METHODS FOR STIMULATING THE CENTRAL NERVOUS SYSTEM

This application is a continuation application of application Ser. No. 742,994, filed June 17, 1958, now abandoned, of Charles R. Jacobson et al. and entitled URAZOLE COMPOUNDS, PHARMACEUTICAL COMPOSITIONS CONTAINING SAME, AND PROCESS OF ADMINISTERING SAME.

The present invention relates to urazole compounds and more particularly to urazole compounds of noteworthy therapeutic value, to processes of making such urazole compounds, and to methods of using same in human and veterinary medicine.

More particularly, the present invention relates to the new and useful therapeutic process for the amelioration or elimination of convulsions or seizures and other manifestations of epilepsy, either idiopathic or of traumatic or exogenous origin including those found in arteriosclerosis and those that are induced by drugs, by the administration of known and new chemical compounds of the urazole series, i.e., to derivatives of 1H-1,2,4,-triazole-3,5-(2H,4H)-dione, commonly and hereafter referred to as urazoles.

It has been found that the urazole derivatives useful in this process are 1,2-disubstituted or 1,2,4-trisubstituted urazoles which are represented by the general formula I,

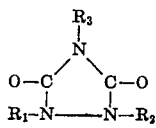

wherein $R_1$ represents a phenyl radical either unsubstituted or substituted by lower alkyl radicals and/or lower alkoxy groups and/or halogen, $R_2$ represents a straight-chain or branched-chain alkyl radical, preferably those containing one to 12 carbon atoms which may be substituted by halogen, hydroxyl, or alkoxy groups, and alkenyl radical, preferably containing two to five carbon atoms, a cycloalkyl radical of five to seven carbon atoms which may be substituted by lower alkyl radicals or lower alkoxy groups, a phenyl-substituted lower alkyl radical, and a phenyl radical which may be substituted by lower alkyl, lower alkoxy, hydroxyl, amino, or substituted amino groups, or halogen, and wherein $R_3$ represents hydrogen, a straight-chain or branched-chain alkyl radical preferably containing one to six carbon atoms which may be substituted by hydroxyl, lower carbalkoxy or carboxamido groups or halogen, an alkenyl radical preferably of two to five carbon atoms, a phenyl radical, and a lower alkoxy carbonyl group.

The new and therapeutically useful process of the present invention involves the administration of the above-described urazole derivatives to humans afflicted with convulsions or seizures such as are characteristic of the epileptic syndrome or other diseases. Administration of these therapeutic agents to humans can be accomplished either orally or parenterally. For oral therapy the pure compounds may be administered or they may be combined with conventional pharmaceutical excipients, diluents, and binders and converted into conventional dry dosage forms such as tablets, pills, capsules, powders and the like. Suspensions in appropriate agents, gels, or similar vehicles may be used for either oral or parenteral dosage forms. As the pure compounds are generally not appreciably water soluble, where aqueous solutions are to be preferred, the disubstituted urazole derivatives are converted into their water-soluble salts with ammonia, alkali metal hydroxides, carbonates, bicarbonates, and the like, or with organic bases such as alkyl amines, alkanol amines, and the like to provide a convenient water-soluble dosage form. The salts of the disubstituted urazoles with bases may also be prepared for oral administration in conventional pharmaceutical vehicles, such as syrups and elixirs suitably flavored and colored. Water-insoluble types of the urazoles of the present invention such as the 1,2,4-trisubstituted urazoles may be compounded with solubilizing or lyophilizing agents to make liquid preparations suitable for oral administration. Rectal administration of the urazole derivatives of the present invention can be accomplished by admixture or solution of these therapeutic agents with cacao butter, glycerinated gelatin, polyethylene gylcol bases and other conventional pharmaceutical suppository bases.

The urazole derivatives useful in this therapeutic process have never previously been employed as therapeutic agents. These compounds have been evaluated and classified pharmacologically on the basis of their relative effectiveness in preventing the convulsions induced by pentamethylene tetrazole, electroshock, and strychnine, according to the test methods described by Elizabeth H. Jenney and Carl C. Pfeiffer "Ann. N.Y. Acad. Sci." vol. 64, page 679 (1956). They have been found to be highly effective and therapeutically useful anticonvulsant agents which possess among the series varying degrees of potency and toxicity. However, the compounds of the present invention are generally associated with relatively low toxicity, thus providing a high therapeutic index and an excellent margin of safety for use as effective and reliable anticonvulsant agents.

Especially marked anticonvulsant action is shown by compounds of formula I where $R_1$ is phenyl, $R_2$ is lower alkyl, and $R_3$ is hydrogen, such as 1-phenyl-2-methyl urazole, 1-phenyl-2-ethyl urazole, 1-phenyl-2-n-propyl urazole, 1-phenyl-2-isopropyl urazole, 1-phenyl-2-n-butyl urazole, and 1-phenyl-2-isobutyl urazole. Trisubstituted derivatives of these disubstituted urazoles of formula I in which $R_3$ is lower alkyl also show useful and effective anticonvulsant activity.

New and useful 1,2-disubstituted urazoles of value in the therapeutic process of the present invention are represented by the general formula I wherein $R_1$ represents a phenyl radical either unsubstituted or substituted by lower alkyl radicals, lower alkoxy groups, or halogen, wherein $R_2$ represents a lower alkyl radical of four to five carbon atoms branched on the carbon atom attached to the urazole ring nitrogen atom, such as 2-butyl, 3-pentyl and the like radicals, a higher straight-chain or branched-chain alkyl radical of at least six carbon atoms and preferably with six to 12 carbon atoms, an alkyl radical preferably of one to 12 carbon atoms substituted by halogen, hydroxyl, or alkoxy groups, an alkanyl radical, a cycloalkyl radical of five to seven carbon atoms either unsubstituted or substituted by lower alkyl radicals or alkoxy groups, a phenyl-substituted lower alkyl radical, and a phenyl radical either unsubstituted or substituted by a lower alkyl radical, lower alkoxy, hydroxyl, amino, or substituted amino groups, or halogen, and wherein $R_3$ represents hydrogen.

Another group of new and useful 1,2-substituted urazoles with valuable therapeutic properties according to the present invention is represented by the general formula I wherein $R_1$ represents a phenyl radical further substituted by a lower alkyl radical, a lower alkoxy group, or halogen, wherein $R_2$ represents a lower straight-chain or branched-chain alkyl radical preferably of one to five carbon atoms, and wherein $R_3$ represents hydrogen.

Still another group of new and useful 1,2,4-trisubstituted urazoles of value in the therapeutic process according to the present invention and included in the scope of the present invention are represented by the general formula I wherein $R_1$ represents a phenyl radical either unsubstituted or substituted by lower alkyl radicals, lower alkoxy groups, or halogen, wherein $R_2$ represents a straight-chain or branched-chain alkyl radical, preferably of three to six carbon atoms, a lower alkyl radical substituted by halogen, hydroxyl, or alkoxy groups, a lower alkenyl radical, a cycloalkyl radical of five to seven carbon atoms, a phenyl-substituted lower alkyl radical, and a phenyl radical, either unsubstituted or substituted by lower alkyl radicals, lower alkoxy, hydroxyl, amino, or substituted amino groups, or halogen, and wherein $R_3$ represents a straight-chain or branched-chain alkyl radical preferably containing one to six carbon atoms either unsubstituted or substituted by hydroxyl, lower carbalkoxy, or carboxamido groups, or halogen, an alkenyl radical, preferably of two to five carbon atoms, a phenyl-substituted lower alkyl radical, a phenyl radical, and a lower alkoxy carbonyl group.

The above-described new and novel compounds of the present invention represent an extension of the field of therapeutic agents useful and desirable in the new therapeutic process of the present invention beyond those substances previously described in the literature. They also possess a desirable range of potency as anticonvulsant or antiepileptic agents and can effectively be used in the therapeutic process of the present invention with advantage over known practice.

Extremely useful compounds among the new and novel therapeutic agents are 1,2-disubstituted urazoles of the general formula I wherein $R_1$ is aryl, and $R_2$ is 2-butyl, 3-pentyl, 4-heptyl, allyl, a cycloalkyl radical, or an aryl radical, such specific compounds as 1-phenyl-2-cyclohexyl urazole and 1,2-diphenyl urazole being particularly potent anticonvulsant agents with extremely low toxicity, neurotoxicity as determined according to the method of Swinyard et al., "J. Pharm. Exptl. Therap." vol. 106, page 319 (1952), and central nervous system depressant effects.

Similarly, among the new 1,2,4-trisubstituted urazoles of the general formula I, specific examples of useful and effective anticonvulsant agents with extremely low toxicity are 1-phenyl-2-isopropyl-4-methyl urazole, 1-phenyl-2-n-propyl-4-methyl urazole, 1-phenyl-2-n-propyl-4-ethyl urazole, 1-phenyl-2-n-propyl-4-($\beta$-hydroxy ethyl) urazole, 1-phenyl-2,4-di-n-propyl urazole, and 1-phenyl-2-benzyl-4-($\beta$-hydroxyethyl) urazole.

In addition to the therapeutically useful anticonvulsant action possessed by these known and new urazole derivatives as described within the scope of the present invention, some of these novel compounds have been found to possess other useful therapeutic properties.

Muscle relaxant properties of therapeutic usefulness are also exhibited by certain of the urazoles included within the scope of this invention, a specific example of a compound with such properties being 1-phenyl-2-methyl urazole.

Potent sedative-hypnotic action of the barbiturate type is exhibited by certain of these urazole derivatives, thus providing new and novel nonbarbiturate sedative-hypnotic agents. Particularly useful in this respect are such compounds as 1-phenyl-2-n-amyl urazole, 1-phenyl-2-isoamyl urazole, and 1-phenyl-2-benzyl urazole, which have been shown to be as potent as or more potent than hexobarbital, i.e. sodium 5-(1-cylohexene-1-yl)-1,5-dimethyl barbiturate.

Additional useful therapeutic properties are exhibited by other di- and trisubstituted urazoles included within the scope of the present invention and represented by the general formula I wherein $R_1$ represents a phenyl radical or a lower carbalkoxy radical, $R_2$ represents hydrogen, an aralkyl radical, a lower carbalkoxy, carboxamido, carboxanilido, lower dialkyl carboxamido group, or a phenyl radical and wherein $R_3$ represents hydrogen, a lower alkyl, cyclohexyl, aralkyl, or phenyl radical, but wherein only one of said substitutents $R_2$ and $R_3$ is hydrogen.

The above-described urazole derivatives possess useful and valuable therapeutic properties as analgesic and anti-inflammatory agents which can be employed in therapy in conditions such as, for instance, rheumatic disorders and arthritis.

Further compounds included within the scope of the present invention are 1,2-disubstituted urazoles and 1,2,4-trisubstituted urazoles represented by the general formula I, wherein $R_1$ and $R_2$ represent like or different lower alkyl radicals either unsubstituted or substituted by halogen, hydroxyl, or lower alkoxy groups, cycloalkyl radicals of five to seven carbon atoms, and phenyl-substituted lower alkyl radicals, and wherein $R_3$ represents hydrogen, a lower alkyl radical, a hydroxy alkyl group, or an aralkyl radical. The above-described urazole derivatives exhibit useful central nervous system stimulatory properties.

The disubstituted urazoles of the present invention possess an acidic hydrogen atom on the unsubstituted urazole ring nitrogen atom and, therefore, these compounds are capable of forming salts with alkali metals such as sodium or potassium and with organic bases. The salts of these urazoles are, in general, stable and readily water soluble and they provide a convenient means of preparing aqueous solutions of these novel and therapeutically useful compounds. It is to be understood, therefore, that the salts of the disubstituted urazoles of the present invention, obtainable by treating the urazoles with alkali metal hydroxide, bicarbonate, or carbonate solutions or with organic bases are within the scope of the present invention.

The chemical literature reveals that all generally applicable known syntheses of urazoles initiate from hydrazine or its suitably substituted derivatives. Only 1-monosubstituted aryl urazoles have been synthesized directly from a monosubstituted hydrazine or its acid addition salt by a one-step condensation-cyclization reaction where reagents containing the —N—CO— linkage and capable of condensing with a hydrazine such as urea and biuret have been most frequently used. Hydrazo dicarbonamide, ethyl carbethoxythiocarbamate, and the like compounds have also been employed for this purpose. Subsequently, the same general procedure was employed to prepare 1-phenyl urazole by heating together phenyl hydrazine and allophanic acid esters at temperatures above 140° C.

To accomplish these condensation-cyclization reactions the reactants have usually been heated in the absence of solvents to temperatures in the range of 150° C. to 230° C. Low yields are frequently obtained and considerable quantities of other products are often encountered making isolation and purification of the desired products difficult.

The literature reports that ethyl carbethoxythiocarbamate, a reagent not readily prepared, condenses with phenylhydrazine at temperatures not exceeding 100° C. However, the product of the reaction is not 1-phenylurazole, but is rather the 0-ethyl derivative which must be hydrolyzed to 1-phenylurazole.

In the prior art, all other syntheses of 1-monosubstituted urazoles or 1,2-disubstituted urazoles prepared from noncyclic starting materials have required the preparation of the monocarboxamide derivatives of the hydrazines such as semicarbazides which derivatives either are condensed and cyclized to urazoles by the above-described process or are further substituted with carboxyl, carbalkoxy, or carboxamido groups followed by cyclization to urazoles. All these known processes require several steps to obtain the desired products.

The above-described processes for the synthesis of 1-monosubstituted and 1,2-disubstituted urazoles suffer from a variety of disadvantages among which are lack of wide adaptability, multistep reaction sequences, high reaction temperatures, and low yields with resulting difficulties in isolation and purification of the products.

According to a specific valuable embodiment of the present invention a preferred method (process A) of manufacture of a wide variety of 1-monosubstituted and 1,2-disubstituted urazoles in good to excellent yields consists in the condensation of 1-monosubstituted or 1,2-disubstituted hydrazines with lower alkyl esters of allophanic acid in an inert solvent at temperatures above 100° C. and preferably but not necessarily below 140° C.

PROCESS A

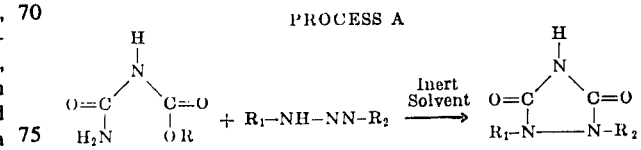

In process A,

R represents preferably a lower alkyl radical, and $R_1$ and $R_2$ represent hydrogen, straight-chain or branched-chain alkyl radicals, preferably those containing one to 12 carbon atoms, alkenyl radicals, preferably those containing two to five carbon atoms, cycloalkyl radicals of five to seven carbon atoms, aralkyl radicals, and aryl radicals, said alkyl, alkenyl, cycloalkyl, aralkyl, and aryl radicals being either unsubstituted or substituted by alkyl radials, alkoxy, hydroxyl, acyloxy, mercapto, alkyl mercapto, carbalkoxy, carboxamido, sulfonamido, nitro, amino or substituted amino groups, halogen, or $R_1$ and $R_2$ together forming a saturated or unsaturated polymethylene chain, whereby, however, $R_1$ and $R_2$ shall not simultaneously represent hydrogen.

The temperature of the reaction is best, but not necessarily controlled by the boiling point of the solvent employed. Solvents from which lower alkanols can be readily separated by distillation and in which ammonia is not readily soluble at the temperature of the reaction are to be preferred. Xylene has been found to be an especially suitable solvent for this reaction while other aromatic hydrocarbons, such as toluene, mesitylene, and others, aromatic and high-boiling aliphatic esters such as anisole, phenetole, di-n-butyl ether, and others, boiling petroleum fractions, and high-boiling aliphatic hydroxylic solvents such as amyl alcohol, glycerol, propylene glycol, and others may be used.

In general, process A involves combining the appropriately substituted hydrazine with the allophanic acid ester in the solvent either before or after heating to the reaction temperature above 100° C. The evolved alcohol and ammonia, byproducts of the condensation, are removed from the reaction zone as they form. When alcohol and ammonia evolution are complete, the urazole is isolated by separation from the solvent and recrystallization, distillation, or other appropriate means of purification.

Use of process A allows both 1-monosubstituted and 1,2-disubstituted urazoles to be obtained through a single reaction from the starting hydrazine. By use of an appropriate inert solvent generally lower reaction temperatures are employed than have previously been possible and reactions are easier to control providing generally higher yields of purer products.

Another preferred process, B, for the manufacture of 1-monosubstituted and 1,2-disubstituted urazoles has been found which process involves the condensation of 1-monosubstituted or 1,2-disubstituted hydrazines with imido dicarboxylic acid esters (aza malonic acid esters) at temperatures above 100° C. and preferably but not necessarily below 140°.

PROCESS B

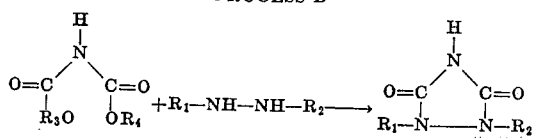

In process B, $R_1$ and $R_2$ represent the same substituents as described above for $R_1$ and $R_2$ in process A, while $R_3$ and $R_4$ preferably represent lower alkyl radicals.

The dimethyl or diethyl esters of imido dicarboxylic acid are preferred for use in this process but any lower alkyl esters in which the two alkyl radicals are alike or different may be used.

While the condensation will proceed merely upon heating a mixture of the reactants, the use of an inert solvent is desirable. The condensation may be conveniently controlled by the choice of a solvent of appropriate boiling point. As the byproducts of the condensation are alcohols corresponding to the esters employed, the use of solvents from which these lower alkanols can readily be separated by distillation is desirable, as removal and collection of the alcohol from the reaction zone as it forms, provides a convenient measure of the progress of the condensation. When xylene has been employed as the solvent, the condensation has been found generally to proceed rapidly and in excellent yield. Other suitable inert solvents include aromatic hydrocarbons, high-boiling aliphatic and aromatic ethers, high-boiling petroleum fractions, and high-boiling aliphatic hydroxylic solvents as they have been mentioned hereinabove.

Process B comprises, generally, the admixture of the appropriately substituted hydrazine and imido dicarboxylic acid ester and xylene or some other suitable solvent either before or after heating to the reaction temperature above 100° C. The reaction mixture is kept at a temperature preferably in the range of 100–140° C. until alcohol evolution ceases. Isolation of the product is accomplished by separation from the solvent followed by recrystallization, distillation, or other appropriate means of purification.

Process B provides all of the advantages of the previously described process A employing allophanic acid esters and, in addition, it generally proceeds more rapidly at the same temperature and eliminates evolution of gaseous byproducts while providing a better means of following the progress of the reaction.

Many of the 1,2-disubstituted urazoles of this invention can also be prepared by alkylation of 1-monosubstituted urazoles by known procedures. Similarly, monoalkylation of 1,2-disubstituted urazoles or dialkylation of 1-monosubstituted urazoles provides many of the 1,2,4-trisubstituted urazoles of this invention.

Other urazole derivatives useful as intermediates for final products of this invention, which cannot be synthesized by the preferred processes or by alkylation of 1-monosubstituted or 1,2-disubstituted urazoles can be prepared by other methods known in the literature. For example, 1,4-disubstituted urazoles can readily be prepared by treatment of 2,4-disubstituted-1-carbalkoxy semicarbazides with hot alkali hydroxide solutions. In this way, 1,4-diphenyl urazole can be prepared from 2,4-diphenyl-1-carbethoxy semicarbazide. Similarly, the 1-aryl-4-alkyl urazoles, 1-aryl-4-cycloalkyl urazoles, 1-aryl-4-aralkyl urazoles, and 1,4-diaryl urazoles can be synthesized from the appropriately substituted semicarbazides. Alternatively, ethyl carbethoxythiocarbamate reacts with monosubstituted hydrazines accompanied by evolution of hydrogen sulfide to yield 1-substituted-3-ethoxy-1,2,4-triazole-5-ones which can readily be hydrolyzed to 1-monosubstituted urazoles or can first be alkylated with appropriate alkylating reagents in the presence of alkali hydroxides followed by hydrolysis to yield 1,4-disubstituted urazoles. For example, phenyl hdyrazine and n-butyl iodide employed in this process yield 1-phenyl-4-n-butyl urazole.

The alkali metal salts of the 1,4-disubstituted urazoles can further be alkylated with appropriate alkylating reagents to give 1,2,4-trisubstituted urazoles. In this way, for example, the sodium salt of 1-phenyl-4-n-butyl urazole can be alkylated with ethyl chloroformate to give 1-phenyl-2-carbethoxy-4-n-butyl urazole. Many of the other urazoles of this invention can also be prepared by the known methods described above through choice of the appropriate reagents as will be apparent to those skilled in the art.

The following examples will illustrate in greater detail the processes for preparing the compounds of this invention. The examples are illustrative of the processes and of the novel compounds of this invention and are not to be construed as imposing any limitations on the invention as defined by the claims.

Process A

Example 1

1-Benzhydryl Urazole

A 2-liter flask equipped with a mechanical stirrer, thermometer, and distilling column topped by a distilling head and condenser is charged with 39 g. of ethyl allophanate, 50 g. of benzhydryl hydrazine, and 600 cc. of xylene. The stirred mixture is heated to 130° C. where ethanol and ammonia are evolved and a clear solution is formed. After heating for 10 hours at 130° C. to 140° C., ethanol and ammonia evolution ceases and the solution is cooled. The solid that separates is filtered off, dried, and dissolved in dilute sodium hydroxide solution. After filtering the solution of the sodium salt to remove insoluble matter, acidification with concentrated hydrochloric acid precipitates 36 g. of 1-benzhydryl urazole which melts at 280° C. with decomposition after recrystallization from glacial acetic acid. The yield is 45 percent.
Analysis:
Calculated for $C_{15}H_{13}N_3O_2$: 67.40% C; 4.90% H; 15.72% N; Found: 67.45% C; 4.97% H; 15.54% N.

Example 2
1-Phenyl Urazole

In the apparatus described in example 1 there are placed 57 g. of methyl allophanate, 52 g. of phenyl hydrazine, and 600 cc. of xylene. The stirred reaction mixture is heated to 125° C where evolution of ammonia and methanol is observed. Heating is continued at 125°–140° C. for 24 hours during which time an essentially clear solution briefly forms followed by separation of a colorless solid. The precipitate is filtered from the colled solution, washed with ether, and dried. Recrystallization from dilute acetic acid yields 72 g. of pure 1-phenyl urazole, a colorless crystalline solid which melts at 268°–270° C. with decomposition. The yield is 85 percent.

When this reaction is conducted in the same manner using 66 g. of ethyl allophanate and 54 g. of phenyl hydrazine in 750 cc. of toluene, isoamyl alcohol, di-n-butyl ether, phenetol, or glycerol, 60–70 percent yields of 1-phenyl urazole are obtained.

Example 3
1,2-Di-isopropyl Urazole

A stirred suspension of 79 g. of ethyl allophanate in 500 cc. of xylene is heated to 120° C. and 70 g. of 1,2-di-isopropyl hydrazine are slowly added thereto. Maintaining the temperature of the reaction mixture at 120° C. for 5 hours, the evolved ethanol is distilled off and the evolved ammonia is allowed to escape. The resulting clear solution is heated an additional 8 hours and is concentrated to dryness under reduced pressure. The residual solid id dissolved in dilute sodium hydroxide solution and the solution is filtered to remove insoluable materials. Addition of concentrated hydrochloric acid precipitates a solid that is recrystallized from heptane to yield 83 g. of 1,2-di-isopropyl urazole, a colorless crystalline solid melting at 139°–141° C. Yield: 75 percent.
Analysis:
calculated for $C_8H_{15}N_3O_2$: 51.87% C; 8.16% H; 22.69% N
Found: 51.97% C; 8.15% H; 22.76% N.

Example 4
1-Phenyl-2-ethyl Urazole

To a stirred refluxing suspension of 53 g. of ethyl allophanate in 400 cc. of xylene, there are added 54 g. of 1-phenyl-2-ethyl hydrazine dissolved in 100 cc. of xylene within 30 minutes. Ethanol and ammonia are evolved and are allowed to escape. The clear yellow solution obtained after 1 hour is refluxed at 130°–140° C. for 18 hours and then the xylene is distilled off under reduced pressure. The residue is dissolved in dilute sodium hydroxide solution and the basic solution is decolorized with charcoal, filtered, and acidified with concentrated hydrochloric acid to precipitate a crystalline solid. Recrystallization of the solid from carbon tetrachloride yields 63 g. of 1-phenyl-2-ethyl urazole as colorless crystals melting at 120°–121° C. Yield: 77 percent.

Example 5
1-Phenyl-2-n-heptyl Urazole

In the apparatus described in example 1, 41 g. of 1-phenyl-2-n-heptyl hydrazine dissolved in 200 cc. of xylene are added within 20 minutes to a refluxing, stirred suspension of 26 g. of ethyl allophanate in 200 cc. of xylene. Ammonia is evolved and ethanol is distilled from the reaction mixture as it forms. The reaction temperature is maintained at 130°–140° C. and a clear yellow solution soon forms that is refluxed for 5 hours until ammonia evolution has almost ceased. After concentration of the solution under reduced pressure, the orange, oily residue is dissolved in dilute sodium hydroxide solution. The basic solution is extracted with ether to remove colored byproducts and then is acidified with concentrated hydrochloric acid. The separated orange oil is extracted into ether, the ether solution is dried over anhydrous sodium sulfate, and the ether is distilled from the dried extract. Distillation of the residue under reduced pressure yields 38 g. of 1-phenyl-2-n-heptyl urazole, a viscous yellow oil that solidifies upon standing. Boiling point: 205°–206° C./0.3 mm.; n$_D^{25}$=1.5362. Yield: 69 percent.
Analysis.
Calculated for $C_{15}H_{21}N_3O_2$: 65.43% C; 7.69% H; 15.26% N. Found: 65.35% C; 7.71% H; 15.06% N.

Example 6
1-p-Tolyl-2-cyclohexyl Urazole

Crude cyclohexanone p-tolyl hydrazone, prepared by condensing cyclohexanone with p-tolyl hydrazine in the presence of a trace of glacial acetic acid according to the method of Carlin and Fisher [J. AM. Chem. Soc. vol. 70, page 3,421 (1948)], is reduced in a 35 percent overall yield by using an excess of lithium aluminum hydride and refluxing the mixture in ether to give 1-p-tolyl-2-cyclohexyl hydrazine in the form of colorless needles melting at 90°–97° C. The hydrochloride salt decomposes at 198° C.

A mixture of 32 g. of ethyl allophanate, 49 g. of the above hydrazine, and 500 cc. of xylene is heated at 130°–138° C for 8 hours accompanied by ethanol and ammonia evolution. The solution is concentrated under reduced pressure, the residue is dissolved in dilute sodium hydroxide solution, and the resulting basic solution is extracted with ether and decolorized with charcoal. Acidification of the basic solution with concentrated hydrochloric acid precipitates a cream-colored solid that is filtered off, washed with water, and dried. Recrystallization from dilute isopropanol yields 52 g. of 1-p-tolyl-2-cyclohexyl urazole as cream-colored crystals melting at 183°–185° C
Analysis:
Calculated for $C_{15}H_{19}N_3O_2$: 65.91% C; 7.01% H; 15.37% N
Found: 66.03% C; 7.05% H; 15.26% N.

Example 7
1-Phenyl-2-benzyl Urazole

A mixture of 27 g. of ethyl allophanate, 40 g. of 1-phenyl-2-benzyl hydrazine, and 500 C. of xylene is condensed by essentially following the procedure of example 1. The solid precipitated by acidification of the solution of the sodium salt is recrystallized from xylene to give 43 g. of 1-phenyl-2-benzyl urazole in the form of colorless crystals melting at 157°–159° C Yield 78 percent.
Analysis
Calculated for $C_{15}H_{13}N_3O_2$: 67.40% C; 4.90% H; 15.72% N. Found: 67.55% C; 4.84% H; 15.82% N.

Example 8
1,2-Diphenyl Urazole

A mixture of 132 g. of ethyl allophanate, 184 g. of hydrazo benzene, and 1,200 cc. of xylene is stirred and refluxed for 30 hours. During this time ethanol and ammonia are involved. A clear solution forms briefly and then a colorless crystalline precipitate separates from the solution. The 1,2-diphenyl urazole is filtered from the cooled solution, washed with ether, and purified by dissolution in 10 percent sodium hydroxide solution, reprecipitation with acid, and recrystallization from isopropanol to yield 180 g. of colorless crystals or needles melting at 228°–230° C. Yield: 71 percent.
Analysis:
Calculated for $C_{14}H_{11}N_3O_2$: 66.39% C; 4.38% H; 16.59% N. Found: 66.52% C; 4.62% H; 16.90% N.

PROCESS B

Example 9
1-Isopropyl Urazole

In a 1-liter round-bottomed flask equipped with a mechanical stirrer, a thermometer, and a short distilling column surmounted by a distilling head with attached condenser and receiver there are placed 32 g. of diethyl imido dicarboxylate, 15 g. of isopropyl hydrazine, and 400 cc. of xylene. The reaction mixture is stirred and heated at 110°–140° C. until no further ethanol distills over. Thereafter the xylene is distilled off under reduced pressure. The dark residue is taken up in a small quantity of ammonium hydroxide solution and, after decolorizing the resulting basic solution with charcoal and filtering it, acidification with acid precipitates 14 g. of 1-isopropyl urazole melting at 188°–190° C. on recrystallization from water.

Example 10
1-(2,5-Dichlorophenyl) Urazole

In the apparatus described in example 9, a mixture of 24 g. of diethyl imido dicarboxylate, 27 g. of 2,5-dichlorophenyl hydrazine, and 250 cc. of xylene is stirred and heated to 130°–140° C. Complete solution forms quickly from which ethanol is distilled and a solid soon separates. In 1 hour the theoretical quantity of ethanol has been collected and refluxing is continued for an additional hour. The solid is filtered from the cooled mixture and is dissolved in dilute sodium hydroxide solution. After filtering off a small quantity of insoluble material, the resulting basic solution is acidified. The precipitated white solid is recrystallized from water to give 34 g. of 1-(2,5-dichlorophenyl) urazole in the form of colorless needles melting at 209°–211° C. Yield: 92 percent.
Analysis:
Calculated for $C_8H_5N_3O_2Cl_2$: 39.05% C, 2.05% H, 17.08% N.
Found: 39.21% C; 2.16% H; 17.02% N.

Example 11
1,2-Dicyclohexyl Urazole.

A mixture of 48 g. of diethyl imido dicarboxylate and 59 g. of 1,2-dicyclohexyl hydrazine in 500 c.c. of xylene is reacted at 120°–140° C. as described in the above examples until 1 hour after ethanol distillation has ceased. Concentration of the solution and purification of the solid residue by dissolving it as the sodium salt, reprecipitating the free acid, and recrystallizing said acid from a mixture of isopropanol and heptane (1:10) yields 61 g. of 1,2-dicyclohexyl urazole in the form of colorless platelets melting at 205°–207° C. with decomposition.
Analysis:
Calculated for $C_{14}H_{23}N_3O_2$: 63.36% C; 8.74% H; 15.84% N.
Found: 63.45% C; 8.91% H; 15.88% N.

Example 12
1-phenyl-2-Isopropyl Urazole

One hundred sixty-one grams of diethyl imido dicarboxylate and 150 g. of 1-phenyl-2-isopropyl hydrazine in 1,000 cc. of xylene are reacted at 120°–138° C. for 5 hours as described in the above examples. Most of the product is isolated by filtration of the cooled reaction mixture while additional small amounts are recovered by concentration of the filtrate. Recrystallization of the crude material from dilute isopropanol yields 180 g. of 1-phenyl-2-isopropyl urazole in the form of colorless crystals melting at 162°–164° C. Yield: 90 percent.

The use of toluene at 107°–111° C. for 24 hours, of isoamyl alcohol at 125°–131° C. for 3 hours, of di-n-butyl ether at 135°–140° C. for 2 hours, and of anisole at 145°–150° C. for 2 hours as solvents in the above reaction gives yields of 75–80 percent of 1-phenyl-2-isopropyl urazole.

Example 13
1-Phenyl-2-(3-pentyl) Urazole

A solution of 48 g. of diethyl imido dicarboxylate and 53 g. of 1-phenyl-2(3-pentyl) hydrazine in 500 c.c. of xylene is reacted at 120°–140° C. until 1 hour after ethanol evolution ceased. Concentration of the resulting solution under reduced pressure yields a solid residue which after the usual purification gives 64 g. of 1-phenyl-2-(3-pentyl) urazole in the form of cream-colored crystals melting at 120°–122° C. Yield: 87 percent.
Analysis:
Calculated for $C_{13}H_{15}N_3O_2$: 63.14% C; 6.93% H; 16.99% N.
Found: 63.20% C; 6.99% H; 16.87% N.

Example 14
1-Phenyl-2-cyclohexyl Urazole

A mixture of 80 g. of diethyl imido dicarboxylate and 95 g. of 1-phenyl-2-cyclohexyl hydrazine in 750 cc. of xylene is refluxed at 120°–140° C. while allowing the ethanol formed in the reaction to distill off. The theoretical quantity of ethanol is collected within 2 hours and, after an additional hour, the solution is evaporated to dryness under reduced pressure. The resulting solid residue is dissolved in dilute sodium hydroxide solution and the basic solution is extracted with ether, decolorized with charcoal, and acidified with hydrochloric acid to precipitate 125 g. of 1-phenyl-2-cyclohexyl urazole. Recrystallization from dilute isopropanol gives 116 g. of colorless crystals melting at 140°–142° C. Yield: 90 percent.
Analysis:
Calculated for $C_{14}H_{17}N_3P_2$: 64.84% C; 6.61% H; 16.21% N.
Found: 64.95% C; 6.92% H; 16.34% N.

Example 15
1-Phenyl-2-allyl Urazole

Sixteen grams of diethyl imido dicarboxylate and 14 g. of 1phenyl-2-allyl hydrazine in 200 cc. of xylene are reacted as described in the above examples. A colorless solid is obtained which, on recrystallization from water, melts at 61°–63° C. and represents the hemihydrate of 1-phenyl-2-allyl urazole. Distillation of this compound at 178°–180° C./0.1 mm. produces crystalline 1-phenyl-2-allyl urazole of the melting point 101°–102° C.
Analysis:
Calculated for $C_{11}H_{11}N_3O_2$: 60.82% C; 5.11% H; 19.34% N.
Found: 60**% C; 5.27% H; 19.13% N.

Example 16
1-Phenyl-2-(1-phenyl ethyl) Urazole

Sixteen grams of diethyl imido dicarboxylate and 21 g. of 1-phenyl-2-(1-phenyl ethyl) hydrazine in 200 cc. of xylene are reacted as described in the above examples. After purification and recrystallization from carbon tetrachloride, 24 g. of 1-phenyl-2-(1-phenyl ethyl) urazole are obtained as colorless crystals melting at 122°–124° C.
Analysis:
Calculated for $C_{16}H_{15}N_3O_2$: 68.31% C; 5.38% H; 14.94% N.
Found: 68.35% C; 5.42% H; 14.84% N.

In the same manner, employing either process A or process B, 1-ethyl urazole may be prepared from ethyl hydrazine; 1-n-butyl urazole may be prepared from n-butyl hydrazine; 1-n-hexyl urazole may be prepared from n-hexyl hydrazine; 1-benzyl urazole may be prepared from benzyl hydrazine; 1-(2-hydroxy ethyl) urazole may be prepared from 1-(2-hydroxy ethyl) hydrazine; 1-(3-hydroxy-2-butyl) urazole may be prepared from 1-(3-hydroxy-2butyl) hydrazine; 1,2-di-n-propyl urazole may be prepared from 1,2-di-n-propyl hydrazine; 1,2-di-n-butyl urazole may be prepared from 1,2-di-n-butyl hydrazine; 1,2-di-n-amyl urazole may be prepared from 1,2-di-n-amyl hydrazine; 1,2-di-(1-phenyl ethyl) urazole may be prepared from 1,2-di-(1-phenyl ethyl) hydrazine; 1-isopropyl-2-methyl urazole may be prepared from 1-isopropyl-2-methyl hydrazine; 1-phenyl-2-dodecyl urazole may be prepared from 1-phenyl-2-dodecyl hydrazine; 1phenyl-2-o-tolyl urazole may be prepared from 1-phenyl-2-o-tolyl hydrazine; 1-phenyl-2-p-tolyl urazole may be prepared from 1-phenyl-2-p-tolyl hydrazine; 1phenyl-2-p-methoxy phenyl urazole may be prepared from 1-phenyl-2-p-methoxy-phenyl hydrazine; 1-phenyl-2-p-hydroxy phenyl urazole may be prepared from 1-phenyl-2-p-hydroxy phenyl hydrazine; 1-phenyl-2-p-bromo phenyl urazole may be prepared from 1-phenyl-2-p-bromo phenyl hydrazine; 1-phenyl-2-p-amino phenyl urazole may be prepared from 1-phenyl-2-p-amino phenyl hydrazine; 1-phenyl-2-p-dimethylamino phenyl urazole may be prepared from 1-phenyl-2-p-dimethylamino phenyl hydrazine; 1,2-di-m-tolyl urazole may be prepared from 1,2-di-m-tolyl hydrazine and 1-o-tolyl-2-(3-methyl-4-amino phenyl) urazole may be prepared from 1-o-tolyl-2-(3-methyl-4-amino phenyl) hydrazine.

ALKYLATION

Example 17
1-Phenyl-2-ethyl Urazole

A mixture of 18 g. of 1-phenyl urazole and 5.7 g. of potassium hydroxide in 500 c.c. of 75 percent isopropanol is stirred and heated to reflux. Thereby, a clear solution of the sodium salt is formed. After slow addition of 16 g. of ethyl iodide, the solution is refluxed for 18 hours and then evaporated to dryness under reduced pressure. Extraction of the solid residue with chloroform yields an insoluble solid from which 5.4 g. of unreacted 1-phenyl urazole are recovered. From the chloroform extract there is isolated a solid that is recrystallized once from 2 percent hydrochloric acid and then from carbon tetrachloride to give 10 g. of 1-phenyl-2-ethyl urazole in the form of long, colorless needles melting at 120°–121°C. Yield: 49 percent.

Example 18
1-Phenyl-2-methallyl Urazole

Nine grams of methallyl chloride are slowly added to a refluxing solution of the sodium salt of 1-phenyl urazole, prepared from 18 g. of 1-phenyl urazole and 4 g. of sodium hydroxide in 400 cc. of methanol. The resulting solution is stirred and refluxed for 15 hours. The solid residue obtained by evaporation of the solution to dryness is extracted with benzene; 2 g. of unreacted 1-phenyl urazole remain as the insoluble portion. The solid obtained by evaporation of the benzene extract is dissolved in dilute sodium hydroxide solution and the resulting basic solution is extracted with ether. Acidification of the basic solution with acid precipitates 18 g. of 1-phenyl-2-methallyl urazole which, after one recrystallization from xylene melts at 128°–129°C.

Analysis:
Calculated for $C_{12}H_{13}N_3O_2$: 62.32% C; 5.67% H; 18.17% N.
Found: 62.28% C; 5.87% H; 18.21% N.

Example 19
1-phenyl-2-benzhydryl Urazole

A mixture of 15 g. of the sodium salt of 1-phenyl urazole and 15 g. of chloro diphenyl methane in 300 c.c. of dry benzene is refluxed for 24 hours. After evaporating the mixture to dryness under reduced pressure, the residue is dissolved in a large volume of dilute sodium hydroxide solution. The basic solution is filtered to remove insoluble material, extracted with ether, and acidified with concentrated hydrochloric acid. The precipitated solid is separated, dried, and extracted with chloroform leaving insoluble 1-phenyl urazole as residue. By evaporating the chloroform solution and twice recrystallizing the residue from xylene, 11 g. of 1-phenyl-2-benzhydryl urazole melting at 209°–211° C. are obtained. Yield: 43 percent.

Analysis:
Calculated for $C_{21}H_{17}N_3O_2$: 73.45% C; 4.99% H; 12.24% N.
Found: 73.24% C; 4.96% H; 12.21% N.

Example 20
1-p-Bromo-phenyl-2-methyl Urazole.

A mixture of 13 g. of 1-p-bromo phenyl urazole and 2 g. of sodium hydroxide in 350 c.c. of methanol is refluxed for 30 minutes. Thereafter, 8 g. of methyl iodide are slowly added. After 1 hour of refluxing, a clear yellow solution is formed which is refluxed for an additional 7 hours and then is evaporated to dryness under reduced pressure. The residue is treated with dilute sodium hydroxide solution and the resulting basic solution is extracted with ether. Acidification of the basic solution precipitates a solid that is recrystallized from xylene to yield 9 g. of 1-p-bromo phenyl-2-methyl urazole in the form of colorless crystals melting at 186°–188°C. Yield: 67 percent.

Analysis:
Calculated for $C_9H_8N_3O_2Br$: 40.01% C; 2.99% H; 15.56% N.
Found: 40.02% C; 3.12% H; 15.44% N.

In the same way 1-isopropyl urazole and methyl iodide yield 1-isopropyl-2-methyl urazole; 1-benzhydryl urazole and methyl iodide yield 1-benzhydryl-2-methyl urazole; 1-cyclohexyl urazole and ethyl iodide yield 1-cyclohexyl-2-ethyl urazole; 1-o-ethyl phenyl urazole and methyl iodide yield 1-o-ethyl phenyl-2-methyl urazole; 1-p-ethoxy phenyl urazole and allyl chloride yield 1-p-ethyoxy phenyl-2-allyl urazole; 1-o-chloro phenyl urazole and isoamyl bromide yield 1-o-chloro phenyl-2-isoamyl urazole; 1-(2,5-dichloro phenyl) urazole and benzyl chloride yield 1-(2,5-dichloro phenyl)-2-benzyl urazole.

EXAMPLE 21
1-Phenyl- 2,4-di-n-propyl Urazole

A mixture of 18 g. of 1-phenyl urazole and 12 g. of potassium hydroxide in 300 c.c. Twenty-five 75 percent isopropanol is heated to reflux. Twenty grams of n-propyl bromide are slowly added to the solution and refluxing is continued for 18 hours. An additional 5 g. of potassium hydroxide and 12 g. of n-propyl bromide are added and heating is continued for 8 hours. After evaporating the solution to dryness, dilute sodium hydroxide solution is added to the residue and the separated insoluble oil is extracted with ether. Two grams of unreacted 1-phenyl urazole are recovered by acidification of the basic aqueous phase. The dried ether extract is concentrated and the residue is distilled under reduced pressure to give 21 g. of 1-phenyl-2,4-di-n-propyl urazole, a slightly viscous, pale yellow oil. Boiling point: 133°–136° C./0.3 mm., $n_D^{25}=1.5298$, Yield: 80percent.

Analysis:
Calculated for $C_{14}H_{19}N_3O_2$: 64.35% C; 7.33% H; 16.08% N.
Found: 64.45% C; 7.44% H; 16.19% N.

EXAMPLE 22
1-Phenyl- 2,4-dibenzyl Urazole

To a hot suspension of 24 g. of the potassium salt of 1-phenyl urazole, prepared by adding the free urazole to a refluxing solution of 13.5 g. of potassium hydroxide in 500 c.c. of 99 percent isopropanol, there are slowly added 28 g. of benzyl chloride. The resulting mixture is refluxed for 24 hours.

After evaporating the reaction mixture to dryness under reduced pressure, the residue is boiled for a short time with 10 percent sodium hydroxide solution, the mixture is cooled, and the solid is filtered off and washed thoroughly with water. Recrystallization of the solid from isopropanol and then from heptane yields 32 g. of 1-phenyl- 2,4-dibenzyl urazole in the form of colorless crystals melting at 100°–102° C. Yield: 75 percent.

Analysis:
Calculated for $C_{22}H_{19}N_3O_2$: 73.93% C; 5.36% N; 11.76% N.
Found: 73.88% C; 5.35% N; 11.76% N.

By the above procedure 1,2,4-triisopropyl urazole may be prepared from 1-isopropyl urazole and isopropyl bromide; 1-n-hexyl-2,4-di-n-butyl urazole may be prepared from 1-n-hexyl urazole and n-butyl bromide; 1-(2-hydroxy ethyl)-2,4-diethyl urazole may be prepared from 1-(2-hydroxy ethyl) urazole and ethyl iodide; 1-p-tolyl-2,4-dimethyl urazole may be prepared from 1-p-tolyl urazole and methyl iodide; 1-p-bromo phenyl-2,4-dimethyl urazole may be prepared from 1-p-bromo phenyl urazole and methyl iodide; 1-(2,5-dichloro phenyl)-2,4-di-n-propyl urazole may be prepared from 1-(2,5-dichloro phenyl) urazole and n-propyl iodide; and 1-phenyl-2,4-di-(2-hydroxy ethyl) urazole may be prepared from 1-phenyl urazole and ethylene bromohydrin.

Example 23
1,2-Diisopropyl-4-n-propyl Urazole

A mixture of 37 g. of 1,2-diisopropyl urazole and 8 g. of sodium hydroxide in 300 c.c. of 99 percent isopropanol is refluxed for 30 minutes. Thereafter, 25 g. of n-propyl bromide are added to the solution. After 18 hours of refluxing the precipitated sodium bromide is filtered off and the filtrate is concentrated under reduced pressure. Dilute sodium hydroxide solution is added to the residue and the precipitated insoluble oil is extracted with ether. By acidification of the basic solution, unreacted 1,2-diisopropyl urazole (5 g.) is recovered. Evaporation of the dried ether extracts and distillation of the residue under reduced pressure yields 26 g. of 1,2-diisopropyl-4n-propyl urazole in the form of a pale yellow oil, boiling point: 76–77° C./0.3 mm., $n_D^{25}=1.4609$. Yield: 57 percent.

Analysis:
Calculated for $_{11}H_{21}N_3O_2$: 58.17% C; 9.31% H; 18.49% N.
Found: 57.98% C; 9.45% H; 18.30% N.

Example 24

1,2-Diphenyl-4-(2hydroxy ethyl) Urazole

To a refluxing solution of 54 g. of 1,2-diphenyl urazole and 12 g. of potassium hydroxide in 350 cc. of water there are slowly added 27 g. of ethylene bromohydrin. An oil soon separates from the refluxing solution to which an additional 12 g. of potassium hydroxide and 27 g. of ethylene bromohydrin are added after 4 hours. After 24 hours the reaction mixture is cooled and the solidified oil is filtered off and washed with hot concentrated ammonium hydroxide and water. From the basic filtrate 1,2-diphenyl urazole (5 g.) is recovered by acidification. The base insoluble product is recrystallized from dilute isopropanol to yield 45 g. of 1,2-diphenyl-4-(2-hydroxyethyl) urazole in the form of colorless needles melting at 130°–132° C. with decomposition. Yield: 71 percent.

Analysis:
Calculated for $C_{16}H_{15}N_3O_3$: 64.63% C; 5.09% H; 14.14% N.
Found: 64.77% C; 5.37% H; 13.91% N.

Example 25

1,2-Diphenyl-4-(2-chloro ethyl) Urazole

A solution of 22 g. of 1,2-diphenyl-4-(2-hydroxy ethyl) urazole in 750 cc of dry benzene is added within 90 minutes to a stirred solution of 12 g. of thionyl chloride and a trace of pyridine in 50 cc. of dry benzene at 25° C. After stirring the solution for 1 hour at 25° C., it is refluxed for 24 hours and evaporated to dryness under reduced pressure. Recrystallization of the residue from isopropanol and then from a mixture of heptane and isopropanol (2:1) and decolorizing with charcoal, yields 20 g. of 1,2-diphenyl-4-(2-chloro ethyl) urazole in the form of colorless needles melting at 111°–113° C. with decomposition.

Analysis:
Calculated for $C_{16}H_{14}O_2Cl$: 60.86% C; 4.47% H; 13.31% N.
Found: 61.05% C; 4.54% H; 13.20% N.

Example 26

Ethyl 1,2-Diphenyl-4-urazolyl Acetate

To a stirred, refluxing solution of 55 g. of the sodium salt of 1,2-diphenyl urazole in 300 c.c. of dry benzene there are slowly added 34 g. of ethyl bromo acetate and the resulting solution is refluxed for 6 hours. Water is added to the cooled reaction mixture and, after separating the benzene layer, the aqueous phase is extracted with benzene. The combined benzene layer and extracts are dried over anhydrous sodium sulfate and evaporated to dryness. Recrystallization of the residue from methanol yields 44 g. of colorless, crystalline ethyl 1,2-diphenyl-4-urazolyl acetate melting at 113°–115° C. Yield: 64 percent.

Analysis:
Calculated for $C_{18}H_{17}N_3O_4$: 63.71% C; 5.05% H; 12.38% N.
Found: 63.73% C; 5.18% H; 12.41% N.

Example 27

1,2-Diphenyl-4-urazolyl acetic Acid

Saponification of the ester obtained according to example 26 by means of potassium hydroxide yields 98 percent of the free acid in the form of the monohydrate. Melting point: 161–163 C.

Analysis:
Calculated for $C_{16}H_{15}N_3O_5$: 58.36% C; 4.59% H; 12.76% N.
Found: 58.42% C; 4.36% H; 13.01% N.

Example 28

1,2-Diphenyl-4-urazolyl Acetamide

Treatment of the above acid with thionyl chloride in refluxing benzene yields a solid acid chloride. On reaction thereof with gaseous ammonia in cold chloroform solution 1,2-diphenyl-4-urazolyl acetamide is obtained in the form of colorless platelets melting at 234–236° C. after recrystallization from dilute isopropanol. The yield is 89 percent.

Analysis:
Calculated for $C_{16}H_{14}N_4O_3$: 61.93% C; 4.55% H; 18.06% N;
Found: 62.00% C; 4.50% H; 18.02% N.

In the same manner 1,2-diisopropyl urazole and methyl iodide yield 1,2-diisopropyl-4-methyl urazole; 1,2-di-n-amyl urazole and ethylene bromohydrin yield 1,2-di-n-amyl-4-(2-hydroxy ethyl) urazole; 1,2-dicyclohexyl urazole and methyl iodide yield 1,2-dicyclohexyl-4-methyl urazole; 1-phenyl-2-methyl urazole and allyl bromide yield 1-phenyl-2-methyl-4-allyl urazole; 1-phenyl-2-isopropyl urazole and ethyl chloroformate yield 1-phenyl-2-isopropyl-4carbethoxy urazole; 1-phenyl-2cyclohexyl urazole and ethyl bromo acetate yield ethyl 1-phenyl-2-cyclohexyl-4urazolyl acetate; 1-phenyl-2-benzhydryl urazole and 3-bromo propanol yield 1-phenyl-2-benzhydryl-4-(3-hydroxy propyl) urazole; 1-phenyl-2-(1phenyl ethyl)urazole and ethyl iodide yield 1-phenyl-2-(1-phenyl ethyl)-4-ethyl urazole; 1-p-tolyl-2methyl urazole and ethylene bromohydrin yield 1-p-tolyl-2-methyl-4-(2-hydroxy ethyl) urazole; 1-p-ethoxy phenyl-2-methyl urazole and 1-bromo-2-propanol yield 1-p-ethoxy phenyl-2-methyl-4-(2-hydroxy propyl) urazole; 1-p-tolyl- 2-cyclohexyl urazole and methyl iodide yield 1-p-tolyl-2-cyclohexyl-4-methyl urazole; 1-(2,5-dichloro phenyl)-2-benzyl urazole and methyl iodide yield 1-(2,5-dichloro phenyl)-2-benzyl-4-methyl urazole; 1,2-diphenyl urazole and n-hexyl bromide yield 1,2-diphenyl-4-n-hexyl urazole; 1-phenyl-2-o-tolyl urazole and methyl iodide yield 1-phenyl-2-o-tolyl4-methyl urazole; 1-phenyl-2-p-methoxy phenyl urazole and allyl bromide yield 1-phenyl-2-p-methoxy phenyl-4-allyl urazole.

It will be evident to those skilled in the art that other substituted urazoles can readily be prepared in the manner described in the above examples by use of either process A or process B and by alkylation of urazoles with appropriate alkylating reagents. For example, in addition to the examples of preparing urazole compounds given hereinabove, the following compounds have been prepared by employing one or the other of the above described methods:

GENERAL FORMULA

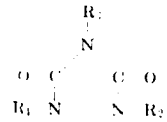

TABLE 1

| Example | $R_1$ | $R_2$ | $R_3$ | Melting point (boiling point) (mm.) degrees C. |
|---|---|---|---|---|
| 29 | (cyclo)$C_6H_{11}$ | H | H | 270–272 |
| 30 | (o)$CH_3$—$C_6H_4$ | H | H | 174–176 |
| 31 | (p)$CH_3$—$C_6H_4$ | H | H | 285 |
| 32 | (o)$C_2H_5$—$C_6H_4$ | H | H | 178–180 |
| 33 | (p)$C_2H_5O$—$C_6H_4$ | H | H | 266 |
| 34 | (o)Cl—$C_6H_4$ | H | H | 191–193 |
| 35 | (m)Cl—$C_6H_4$ | H | H | 228–230 |
| 36 | (p)Cl—$C_6H_4$ | H | H | 268 |
| 37 | (p)Br—$C_6H_4$ | H | H | 300 |
| 38 | (p)$O_2N$—$C_6H_4$ | H | H | 254 |

| Example | R₁ | R₂ | R₃ | Melting point (boiling point) (mm.) degrees C |
|---|---|---|---|---|
| 39 | C₆H₅ | CH₃ | H | 184-186 |
| 40 | C₆H₅ | n-C₃H₇ | H | 128-130 |
| 41 | C₆H₅ | n-C₄H₉ | H | 129-131 |
| 42 | C₆H₅ | iso-C₄H₉ | H | ¹ 155 |
| 43 | C₆H₅ | CH(CH₃)—CH₂—CH₃ | H | 142-144 |
| 44 | C₆H₅ | n-C₅H₁₁ | H | 75-77 |
| 45 | C₆H₅ | iso-C₅H₁₁ | H | 96-98 |
| 46 | C₆H₅ | CH(n-C₃H₇)₂ | H | 117-118 |
| 47 | C₆H₅ | n-C₁₀H₂₁ | H | 51-52 |
| 48 | C₆H₅ | (cyclo)C₅H₉ | H | 146-148 |
| 49 | C₆H₅ | (o)CH₃—(cyclo)C₆H₁₁ | H | 132-134 |
| 50 | C₆H₅ | (p)CH₃—(cyclo)C₆H₁₁ | H | 161-163 |
| 51 | C₆H₅ | p-CH₃O—(cyclo)C₆H₁₁ | H | 150-155 |
| 52 | C₆H₅ | (cyclo)C₇H₁₃ | H | 151-152 |
| 53 | (p)CH₃—C₆H₄ | CH₃ | H | 195-200 |
| 54 | (p)Br—C₆H₄ | CH₃ | H | 186-188 |
| 55 | (o)Cl—C₆H₄ | CH₃ | H | 213-214 |
| 56 | 2,5-(Cl)₂—C₆H₃ | CH₃ | H | 207-208 |
| 57 | (p)C₂H₅O—C₆H₄ | CH₃ | H | 204-206 |
| 58 | (o)Cl—C₆H₄ | (cyclo)C₆H₁₁ | H | 192-193 |
| 59 | C₆H₅ | CH₂—CH=CH—CH₃ | H | 145-147 |
| 60 | C₆H₅ | CH₂—CH₂—C₆H₅ | H | 153-154 |
| 61 | C₆H₅ | H | CH₃ | ¹ 227-228 |
| 62 | C₆H₅ | H | C₂H₅ | 176-178 |
| 63 | C₆H₅ | H | n-C₃H₇ | 120-122 |
| 64 | C₆H₅ | H | CH₂—C₆H₅ | 232-234 |
| 65 | C₆H₅ | H | n-C₄H₉ | 151-153 |
| 66 | C₆H₅ | H | C₆H₅ | 165-167 |
| 67 | CH₃ | CH₃ | CH₃ | 64-66 |
| 68 | iso-C₃H₇ | iso-C₃H₇ | iso-C₅H₁₁ | { (106-109) (0.9) |
| 69 | (cyclo)C₆H₁₁ | (cyclo)C₆H₁₁ | n-C₃H₇ | 56-58 |
| 70 | C₆H₅ | CH₃ | CH₃ | 94-96 |
| 71 | C₆H₅ | CH₃ | CH₂CH₂OH | 140-141 |
| 72 | C₆H₅ | CH₃ | n-C₃H₇ | 81-82 |
| 73 | C₆H₅ | CH₃ | iso-C₅H₁₁ | 176-178 |
| 74 | C₆H₅ | CH₃ | C₆H₅ | 133-135 |
| 75 | C₆H₅ | C₂H₅ | CH₃ | { (118-120) (0.3) 52-53 |
| 76 | C₆H₅ | C₂H₅ | C₂H₅ | { (128-130) (0.4) |
| 77 | C₆H₅ | C₂H₅ | C₆H₅ | 126-128 |
| 78 | C₆H₅ | n-C₃H₇ | CH₃ | { (134-138) (0.3) |
| 79 | C₆H₅ | n-C₃H₇ | C₂H₅ | { (125-126) (0.3) |
| 80 | C₆H₅ | n-C₃H₇ | CH₂—CH₂—OH | { (172-175) (0.3) |
| 81 | C₆H₅ | iso-C₃H₇ | CH₃ | 67-69 |
| 82 | C₆H₅ | iso-C₃H₇ | CH₂—CH₂—OH | { (170/173) (0.1) 54-56 |
| 83 | C₆H₅ | iso-C₃H₇ | n-C₃H₇ | { (119-121) (0.15) |
| 84 | C₆H₅ | iso-C₃H₇ | iso-C₃H₇ | 88-90 |
| 85 | C₆H₅ | iso-C₅H₁₁ | n-C₃H₇ | { (144-148) (0.3) |
| 86 | C₆H₅ | (cyclo)C₆H₁₁ | CH₃ | 117-118 |
| 87 | C₆H₅ | (cyclo)C₆H₁₁ | CH₂—CH₂—OH | { (197-198) (0.15) 82-84 |
| 88 | C₆H₅ | (cyclo)C₆H₁₁ | n-C₃H₇ | { (169-170) (0.5) |
| 89 | C₆H₅ | CH₂—C₆H₅ | CH₃ | 115-117 |
| 90 | C₆H₅ | CH₂—C₆H₅ | CH₂—CH₂—OH | 86-87 |
| 91 | C₆H₅ | CH₂—C₆H₅ | n-C₃H₇ | { (181-183) (0.6) |
| 92 | C₆H₅ | CO₂C₂H₅ | CO₂C₂H₅ | 139-141 |
| 93 | C₆H₅ | C₆H₅ | CH₃ | ¹ 140-141 |
| 94 | C₆H₅ | C₆H₅ | C₆H₅ | 135-137 |
| 95 | C₆H₅ | (cyclo)C₆H₁₁ | CH₂OH | 118-120 |
| 96 | C₆H₅ | C₆H₅ | n-C₃H₇ | 74-75 |
| 97 | C₆H₅ | C₆H₅ | CH₂—CH(OH)—CH₂—OH | 156-158 |
| 98 | C₆H₅ | C₆H₅ | n-C₄H₉ | 85-86 |
| 99 | C₆H₅ | C₆H₅ | n-C₅H₁₁ | 72-74 |
| 100 | C₆H₅ | C₆H₅ | iso-C₅H₁₁ | 110-111 |
| 101 | C₆H₅ | C₆H₅ | CH₂C₆H₅ | 166-168 |
| 102 | C₆H₅ | C₆H₅ | CO₂C₂H₅ | 143-144 |

¹ Dec.

The new urazole compounds according to the present invention can, of course, also be produced according to known processes as they have been mentioned hereinabove. The following examples serve to illustrate the preparation of valuable new urazole compounds according to the present invention without, however, limiting the same thereto.

Example 103

1-Phenyl urazole from phenyl hydrazine hydrochloride and urea.

A stirred mixture of 29 g. of phenyl hydrazine hydrochloride and 24 g. of urea is heated at 160-170° C. for 10 hours. During this time, ammonia is continually evolved. Four hundred cubic centimeters of water are added to the cooled solid mass, the mixture is heated to boiling, and the insoluble brown solid is filtered off and dried. Yield: 20 g. An additional 4 g. of crude product is obtained by chilling the filtrate. The combined crops of crude product are dissolved in dilute sodium hydroxide solution and tarry insoluble impurities are removed by filtration. Acidification of the red filtrate with concentrated hydrochloric acid gives a pink solid that is recrystallized once from methanol and once from dilute acetic acid, decolorizing with charcoal, to yield 18 g. of 1-phenyl urazole as colorless crystals melting at 265-267° C The yield is 51 percent.

Example 104

1-Phenyl urazole from phenyl hydrazine and ethyl carbethoxy thiocarbamate 5.4 g. of phenyl hydrazine are slowly added to 8.9g. of ethyl carbethoxy thiocarbamate, accompanied by some spontaneous warming and evolution of hydrogen sulfide. The resulting mixture is warmed on a steam bath for 2 hours until evolution of hydrogen sulfide ceases. The precipitated solid is filtered off and recrystallized from ethanol to give 2 g. of 1-phenyl-3-ethoxy-1,2,4-triazol-5-one.

By refluxing 2 g. of 1-phenyl-3-ethoxy-1,2,4-triazol-5-one for 30 minutes with dilute hydrochloric acid, cooling the mixture, and filtering off the precipitated solid, 1.7 g. of 1-phenyl urazole are obtained.

Example 105

1-Phenyl-2-cyclohexyl urazole from 1-phenyl-2-cyclohexyl semicarbazide and urea

To a stirred solution of 38 g. of 1-phenyl-2-cyclohexyl hydrazine in 150 cc. of glacial acetic acid, 20 g. of potassium cyanate are added in small portions during 1 hour. The temperature of the reaction mixture rises to about 40° C. and a yellow slurry forms. After heating the reaction mixture at 60° C. for an additional 30 minutes, during which time most of the solid dissolves, it is poured into 500 cc. of ice and water. The resulting yellow precipitate is recrystallized twice from dilute methanol, decolorizing with charcoal, to give 37 g. of 1-phenyl-2-cyclohexyl semicarbazide as fluffy needles melting at 190–192°C.

Analysis:
Calculated for $C_{13}H_{19}N_3O_2$: 66.92% C; 8.21% H; 18.01% N.
Found: 67.20% C; 8.33% H; 18.01% N.

A mixture of 12 g. of 1-phenyl-2-cyclohexyl semicarbazide and 3.7 g. of urea is heated at 230°–240° C. for 2 hours, ammonia being evolved. The cooled melt is taken up in dilute sodium hydroxide solution and the solution is filtered to remove some insoluble matter. Acidification of the basic solution with concentrated hydrochloric acid precipitates a tan solid that after recrystallization from dilute isopropanol and decolorization with charcoal gives 9.3 g. of 1-phenyl-2-cyclohexyl urazole melting at 138°–140° C.

Example 106

1,4-Diphenyl urazole

Refluxing 6 g. of 1-carbethoxy-2,4-diphenyl semicarbazide with 50 c.c. of 10 percent sodium hydroxide solution for 15 minutes, cooling the solution and acidifying it with concentrated hydrochloric acid gives a tan solid. Recrystallization from acetic acid gives colorless crystals of 1,4-di-phenyl urazole melting at 164°–165° C. The yield is 4.4 g.

Example 107

Sodium Salt of 1,2-diphenyl Urazole

Mixing hot isopropanol solutions containing equimolecular quantities of 1,2-diphenyl urazole and sodium hydroxide produces, after cooling, a colorless crystalline deposit of the sodium salt that is filtered off, washed with cold isopropanol, and dried. Melting point: 344° C. with decomposition.

Example 108

Ethylene Diamine Salt of 1-phenyl-2-cyclohexyl Urazole

To a warm solution of 104 g. of 1-phenyl-2-cyclohexyl urazole in 450 cc. of isopropanol there is added a solution of 25 g. of ethylene diamine in 50 cc. of isopropanol. The cream-colored crystalline deposit formed upon cooling and standing is filtered off, washed with cold isopropanol, and dried. The yield of the water-soluble ethylene diamine salt, melting at 131°–136° C. is 115 g., corresponding to a yield of 90 percent. A 10 percent aqueous solution of the salt has a pH of 9.5.

Other salts of the urazole derivatives of this invention with organic bases may be prepared in a similar manner employing such organic bases as, for instance, ethylamine, diethylamine, isopropylamine, di-n-butylamine, cyclohexylamine, ethanolamine, diethanolamine, diethylamino ethanolamine and the like.

Example 109

Seven hundred fifty milligrams of 1-phenyl-2-cyclohexyl urazole are thoroughly mixed with 3.0 g. of lactose. The mixture is filled into 10 capsules, to be administered orally. The usual dose is one capsule repeated three to five times daily, preferably after meals. The ratio of 1-phenyl-2-cyclohexyl urazole to lactose or other diluent such as sucrose, dextrose, calcium carbonate, and other inert substances, may be varied to adjust the individual dosage. A range of 25 mg. to 300 mg. is the preferred dosage range. The mixed powder may also be administered orally without the capsules, in appropriate divided doses.

Example 110

A mixture of 7.5 g. of 1-phenyl-2-isopropyl-4-methyl urazole, 5.0 g. of talc, 10.0 g. of starch, and 7.5 g. of lactose is carefully prepared in finely ground form. The mixture is prepared in granular form using water, syrup, gelatin paste, starch paste, or other binder, in accordance with known pharmaceutical practice. The mass is dried and the granules are pressed on a tablet machine using a small quantity of talc, magnesium stearate, mineral oil, or other lubricant. A total of 100 tablets each containing 75 mg. of active medicament is produced. Other ratios of the diluents, binders, and lubricants may be used as well as other inert substances such as pectin, dextrose, calcium carbonate, and kaolin. The usual dose is one to three tablets, two to five times daily. Appropriate adjustment in dosage or tablet strength may be made.

Example 111

A solution is prepared by dissolving 0.5 g. of the sodium salt of 1-phenyl-2-cyclohexyl urazole in 10 c.c. of water for injection. The solution is filled into 10 ampuls of 1.0 c.c. each, which are sealed and sterilized. The drug is administered by injection. The injection solution may also be filled into multiple dose sterile vials with perforable stoppers.

Example 112

Five grams of the sodium salt of 1phenyl-2-isopropyl urazole are dissolved in sufficient distilled water to make 100 cc. of solution. The usual dose is 1 cc administered orally, two to five times daily.

Example 113

To 1.5 g. of 1-phenyl-2-cyclohexyl urazole contained in a mortar there are added 0.35 g. of ethylene diamine. Syrup of raspberry is slowly admixed thereto whereby the amine salt of the urazole compound is dissolved. The final volume is adjusted to 100 cc. with syrup of raspberry. The usual dose is ½ to 4 teaspoonfuls.

Example 114

The grams of a 1-phenyl-2-n-propyl-4ethyl urazole are mixed with 12.0 g. of olive oil or other bland-fixed oil such as, for instance, corn oil, cottonseed oil, or rapeseed oil. The oily oily mixture is then emulsified with water using acacia, tragacanth, or other emulsifying agents. The volume is adjusted to 100 cc. The usual dose is ½ to 4 teaspoonfuls.

Example 115

1.5 g. of 1-phenyl-2ethyl urazole are dissolved in aromatic elixir to make a volume of 100 cc. The usual dose is ½ to 4 teaspoonfuls.

Example 116

To 1.5 g. of finely ground 1,2-diphenyl urazole contained in a mortar or other suitable mixing vessel, there is slowly added a 1 percent tragacanth solution with intensive mixing. The volume is finally adjusted to 100 cc. The resulting suspension is suitable for oral administration in the usual dosage range of ¼ to 2 teaspoonfuls. Other suspending and thixotropic agents such as, for example, bentonite, acacia, karaya, iceland moss, pectin, gelatin, methocel and the like may be used. Mechanical methods for dispersion involving homogenizers and intensive mixers may also be used to improve the stability of the suspension.

Example 117

Suppositories for rectal administration are prepared by mixing 100 mg. of 1-phenyl-2-n-propyl urazole with 1.8 g. of cacao butter per suppository. The usual dose is one suppository. Other suppository bases such as, for example, glycerinated gelatin, polyoxy ethylene glycols, and their derivatives may be used.

The above examples are intended for illustration only and are not to be construed as limiting the scope of this invention. The doses may be adjusted to the age and condition of the patient by varying the proportions of the diluents and inert substances. Further dose variations may be accomplished by varying the number of units administered, i.e., the number of tablets, teaspoonfuls, ampuls and the like. The vehicle may be varied to manufacture products of varying color, taste, consistency, texture, and the like. Tablets may be coated, flavored, colored, and otherwise varied in accordance with the usual methods of pharmaceutical manufacture.

The content of active compounds in such preparations used in therapy may, of course, vary. It is necessary that the active compound be present in such an amount that a suitable dosage per dosage unit will be ensured. Tablets containing, for instance, between about 10 mg. and 500 mg. and preferably between about 30 mg. and about 250 mg. of the active compound per tablet have proved to be especially suitable in the case of certain of the urazole derivatives. The urazoles having an anticonvulsant action find therapeutic application in the treatment of convulsions, seizures, and other manifestations of genuine, arteriosclerotic, or drug-induced epilepsy.

The muscle relaxant urazoles are of use in treatment of musculoskeletal disorders and neurological diseases involving skeletal muscle spasm including rheumatic disorders, brusitis, strains, sprains, Cerebral palsy, multiple sclerosis, and Parkinson's disease.

The analgesic and anti-inflammatory urazoles are useful in the treatment of rheumatic, arthritic and allied disorders and generalized inflammatory disorders of acute, subacute, and chronic nature including, for example, acute rheumatic arthritis, gouty arthritis, rheumatoid arthritis, muscular rheumatism, osteoarthritis, bursitis and neuritis.

The urazoles having a central nervous system stimulating effect are useful in the treatment of a wide variety of depressed and fatigued states such as those brought on by illness, drugs, and old age.

The dosage administered varies with the urazole employed, the respective disease, condition and age of the patient. In general, a minimum dose of at least about 0.5 mg. to 1.0 mg. per dosage unit is required Pharmacological tests with the urazole compounds according to the present invention produced the following results:

The generally low neurotoxicity of the urazole derivatives as determined in pharmacological tests on mice according to the method of Swinyard et al. is illustrated by the representative examples in table II.

TABLE II.—NEUROTOXICITY OF URAZOLE DERIVATIVES

| Example Number | Compound of Formula I | | | Oral dose in mice for 50% neurotoxic symptoms (mg./kg.) | | | |
|---|---|---|---|---|---|---|---|
| | $R_1$ | $R_2$ | $R_3$ | Above 1,000 | 300–1,000 | 100–300 | Below 100 |
| 39 | $C_6H_5$ | $CH_3$ | H | X | | | |
| 61 | $C_6H_5$ | H | $CH_3$ | | X | | |
| 70 | $C_6H_5$ | $CH_3$ | $CH_3$ | X | | | |
| 71 | $C_6H_5$ | $CH_3$ | $CH_2$—$CH_2$—OH | X | | | |
| 72 | $C_6H_5$ | $CH_3$ | n-$C_3H_7$ | X | | | |
| 17 | $C_6H_5$ | $C_2H_5$ | H | | | X | |
| 76 | $C_6H_5$ | $C_2H_5$ | $C_2H_5$ | | X | | |
| 40 | $C_6H_5$ | n-$C_3H_7$ | H | | | X | |
| 78 | $C_6H_5$ | n-$C_3H_7$ | $CH_3$ | | X | | |
| 79 | $C_6H_5$ | n-$C_3H_7$ | $C_2H_5$ | | X | | |
| 80 | $C_6H_5$ | n-$C_3H_7$ | $CH_2$—$CH_2$—OH | X | | | |
| 21 | $C_6H_5$ | n-$C_3H_7$ | n-$C_3H_7$ | | X | | |
| 12 | $C_6H_5$ | iso-$C_3H_7$ | H | | | X | |
| 82 | $C_6H_5$ | iso-$C_3H_7$ | $CH_2$—$CH_2$—OH | | X | | |
| 83 | $C_6H_5$ | iso-$C_3H_7$ | n-$C_3H_7$ | X | | | |
| 15 | $C_6H_5$ | $CH_2$—CH=$CH_2$ | H | | | X | |
| 18 | $C_6H_5$ | $CH_2$—C($CH_3$)=$CH_2$ | H | X | | | |
| 43 | $C_6H_5$ | CH($CH_3$)$CH_2$—$CH_3$ | H | | | X | |
| 44 | $C_6H_5$ | n-$C_5H_{11}$ | H | | | | X |
| 45 | $C_6H_5$ | iso-$C_5H_{11}$ | H | | | | X |
| 46 | $C_6H_5$ | CH(n-$C_3H_7$)$_2$ | H | X | | | |
| 7 | $C_6H_5$ | $CH_2$—$C_6H_5$ | H | | | | X |
| 89 | $C_6H_5$ | $CH_2$—$C_6H_5$ | $CH_3$ | X | | | |
| 90 | $C_6H_5$ | $CH_2$—$C_6H_5$ | $CH_2$—$CH_2OH$ | X | | | |
| 19 | $C_6H_5$ | CH($C_6H_5$)$_2$ | H | | X | | |
| 58 | $C_6H_5$ | (cyclo)$C_6H_{11}$ | H | | X | | |
| 86 | $C_6H_5$ | (cyclo)$C_6H_{11}$ | $CH_3$ | X | | | |
| 88 | $C_6H_5$ | (cyclo)$C_6H_{11}$ | n-$C_3H_7$ | X | | | |
| 50 | $C_6H_5$ | (p)$CH_3$—(cyclo)$C_6H_{11}$ | H | | X | | |
| 51 | $C_6H_5$ | (p)$CH_3O$—(cyclo)$C_6H_{11}$ | H | X | | | |
| 52 | $C_6H_5$ | (cyclo)$C_7H_{13}$ | H | X | | | |
| 8 | $C_6H_5$ | $C_6H_5$ | H | | X | | |
| 94 | $C_6H_5$ | $C_6H_5$ | $C_2H_5$ | X | | | |
| 25 | $C_6H_5$ | $C_6H_5$ | $CH_2$—$CH_2$—Cl | X | | | |
| 97 | $C_6H_5$ | $C_6H_5$ | $CH_2$—CH(OH)—$CH_2$—CH | X | | | |
| 101 | $C_6H_5$ | $C_6H_5$ | $CH_2$—$C_6H_5$ | X | | | |
| 102 | $C_6H_5$ | $C_6H_5$ | $CO_2C_2H_5$ | X | | | |
| 28 | $C_6H_5$ | $C_6H_5$ | $CH_2CONH_2$ | X | | | |
| 92 | $C_6H_5$ | $CO_2C_2H_5$ | $CO_2C_2H_5$ | X | | | |
| 11 | (cyclo)$C_6H_{11}$ | (cyclo)$C_6H_{11}$ | H | X | | | |
| 69 | (cyclo)$C_6H_{11}$ | (cyclo)$C_6H_{11}$ | n-$C_3H_7$ | X | | | |

To indicate the efficacy of the compounds of this invention, table III provides a comparison of the neurotoxicity, potency and protective indices of a few of the urazole derivatives with corresponding values for the well-known and clinically useful anticonvulsant, trimethadione, when tested in mice against pentamethylene tetrazole convulsions according to the method described by Elizabeth H. Jenney and Carl C. Pfeiffer, mentioned hereinabove.

TABLE III

| Example Number | Compound of Formula I | | | Neurotoxicity potency protective | | |
|---|---|---|---|---|---|---|
| | $R_1$ | $R_2$ | $R_3$ | ($TD_{50}$) mg./kg. | ($ED_{50}$) mg./kg. | Index (P.I.) |
| 17 | $C_6H_5$ | $C_2H_5$ | H | 286 | 72 | 4.0 |
| 40 | $C_6H_5$ | n-$C_3H_7$ | H | 175 | 54 | 3.2 |
| 12 | $C_6H_5$ | iso-$C_3H_7$ | H | 190 | 37.5 | 5.1 |
| 58 | $C_6H_5$ | (cyclo)$C_6H_{11}$ | H | 780 | 76 | 10.3 |
| 8 | $C_6H_5$ | $C_6H_5$ | H | 300 | 70 | 4.3 |
| 81 | $C_6H_5$ | iso-$C_3H_7$ | $CH_3$ | 250 | 70 | 3.6 |
| 21 | $C_6H_5$ | n-$C_3H_7$ | n-$C_3H_7$ | 750 | 150 | 5.0 |
| Trimethadione | | | | 890 | 240 | 3.7 |

In addition table IV lists some examples of other compounds of this invention that have exhibited useful anticonvulsant action when tested in mice against pentamethylene tetrazole convulsions by the same standard procedures described above. The dose which protects 50 percent of the animals from convulsion ($ED_{50}$) is 500 mg./kg. or less for all of the listed compounds.

TABLE IV

| Example No. | Compound of Formula I | | |
|---|---|---|---|
| | R₁ | R₂ | R₃ |
| 39 | C₆H₅ | CH₃ | H |
| 15 | C₆H₅ | CH₂—CH—CH₂ | H |
| 41 | C₆H₅ | n-C₄H₉ | H |
| 42 | C₆H₅ | iso-C₄H₉ | H |
| 43 | C₆H₅ | CH(CH₃)—CH₂—CH₃ | H |
| 13 | C₆H₅ | CH(C₂H₅)₂ | H |
| 48 | C₆H₅ | (cyclo)C₅H₉ | H |
| 50 | C₆H₅ | (p)CH₃—(cycle)C₆H₁₁ | H |
| 72 | C₆H₅ | CH₃ | n-C₃H₇ |
| 75 | C₆H₅ | C₂H₅ | CH₃ |
| 78 | C₆H₅ | n-C₃H₇ | CH₃ |
| 79 | C₆H₅ | n-C₃H₇ | C₂H₅ |
| 90 | C₆H₅ | CH₂—C₆H₅ | CH₂—CH₂—OH |
| 93 | C₆H₅ | C₆H₅ | CH₃ |
| 97 | C₆H₅ | C₆H₅ | CH₂—CH(OH)—CH₂—CH |
| 102 | C₆H. | C₆H₅ | CO₂C₂H₅ |
| 28 | C₆H₅ | C₆H₅ | CH₂—CONH₂ |

A few examples of the variety of compounds of this invention which exhibit useful anticonvulsant action in mice when tested against electroshock by the above mentioned standard procedures are given in table V. The listed compounds all provide protection for at least 50 percent of the animals tested at a dose of 500 mg./kg. or less.

TABLE V

| Example Number | Compound of Formula I | | |
|---|---|---|---|
| | R₁ | R₂ | R₃ |
| 39 | C₆H₅ | CH₃ | H |
| 17 | C₆H₅ | C₂H₅ | H |
| 40 | C₆H₅ | n-C₃H₇ | H |
| 12 | C₆H₅ | iso-C₃H₇ | H |
| 41 | C₆H₅ | n-C₄H₉ | H |
| 42 | C₆H₅ | iso-C₄H₉ | H |
| 58 | C₆H₅ | (cyclo)C₆H₁₁ | H |
| 8 | C₆H₅ | C₆H₅ | H |
| 75 | C₆H₅ | C₂H₅ | CH₃ |
| 78 | C₆H₅ | n-C₃H₇ | CH₃ |
| 79 | C₆H₅ | n-C₃H₇ | C₂H₅ |
| 21 | C₆H₅ | n-C₃H₇ | n-C₃H₇ |
| 81 | C₆H₅ | iso-C₃H₇ | CH₃ |

Illustrative of the potent sedative-hypnotic action possessed by certain of the urazole derivatives are the results of pharmacological tests measuring the mean sleeping time of mice administered 300 mg./kg. orally of the urazole derivative in comparison with the well-known and highly effective hexobarbital also administered orally in the same dose as shown in table I.

TABLE VI

| Example No. | Drug | Sleeping Time |
|---|---|---|
| 44 | 1-Phenyl-2-n-amyl urazole | 94 minutes |
| 45 | 1-Phenyl-2-isoamyl urazole | 47 minutes |
| | Hexabarbital | 59 minutes |

It is interesting to note that, while the 1-phenyl-2-benzyl urazole has a sedative effect, the 1-phenyl-2-(2'-phenyl ethyl) urazole exerts a stimulating effect upon the central nervous system.

Other pharmacological properties of the urazole derivatives of this invention are represented by the results of more detailed studies on 1-phenyl-2-cyclohexyl urazole.

Oral administration in mice shows that this material possesses an extremely low order of toxicity. The very high dose required to kill 50 percent of the animals tested (LD₅₀) is 3.1 gm./kg. Thus for therapeutic use in humans the drug is considered to be essentially nontoxic.

After oral administration of 1-phenyl-2-cyclohexyl urazole to mice, complete protection against pentamethylene tetrazole convulsions (85 mg./kg., subcutaneously) is provided for 50 percent of the animals tested at a dose of 360 mg./kg. (ED₅₀).

In rabbits after oral administration of the drug followed by 40 mg./kg. of pentamethylene tetrazole, intravenously, the ED₅₀=165 mg./kg. Oral doses of up to 500 mg./kg. of the drug to rabbits produced no observable symptoms.

After a 21-day subacute toxicity experiment in rats receiving 2 gm./kg./day of 1-phenyl-2-cyclohexyl urazole, autopsy of all animals revealed no gross pathologic changes. At this very high dose level no obvious signs of neurotoxicity were noted following drug administration. There was a slight appetite depressant effect and some depression of body weights was noted.

Metabolism studies indicate that 1-phenyl-2-cyclohexyl urazole is completely metabolized in the body, liver degradation being a factor.

Experiments in dogs have also shown that the drug has no curarelike properties and is neither cholinergic nor anticholinergic in action. Rapid intravenous injection into dogs produces hypotension.

We claim:

1. A pharmaceutical composition for stimulating the central nervous system which comprises an amount of at least 0.5 mg. per dosage unit, said amount being sufficient but not greater than that necessary to stimulate the central nervous system, of a urazole compound of the formula

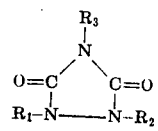

wherein $R_1$ and $R_2$ are alkyl of one to five carbon atoms or phenyl-substituted alkyl of one to five carbon atoms and $R_3$ is a hydrogen atom, alkyl having one to five carbon atoms, alkyl having one to five carbon atoms substituted by a hydroxyl group, or phenyl-substituted alkyl of one to five carbon atoms, or a salt of said urazole compound with an alkali metal hydroxide and a pharmaceutically acceptable carrier.

2. The composition of claim 1, wherein in the urazole $R_3$ is a hydrogen atom and $R_1$ and $R_2$ are each alkyl of one to five carbon atoms.

3. The composition of claim 1, wherein in the urazole $R_3$ is as defined in claim 1 and $R_1$ and $R_2$ are each alkyl of one to five carbon atoms.

4. The composition of claim 1 wherein the dosage unit contains 0.5–1.0 mg. of the urazole compound.

5. The process of causing stimulation of the central nervous system comprising administering to a patient a therapeutical composition containing as central nervous system stimulating agent, in an amount sufficient but not greater than that necessary to stimulate the central nervous system, a urazole compound of the formula

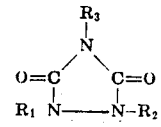

wherein $R_1$ and $R_2$ are alkyl of one to five carbon atoms of phenyl-substituted alkyl of one to five carbon atoms and $R_3$ is a hydrogen atom, alkyl having one to five carbon atoms, alkyl having one to five carbon atoms substituted by a hydroxyl group, or phenyl-substituted alkyl of one to five carbon atoms, or a salt of said urazole compound with an alkali metal hydroxide and a pharmaceutically acceptable carrier.

6. The process of claim 5, wherein in the urazole of the administered composition, $R_3$ is a hydrogen atom and $R_1$ and $R_2$ are each alkyl of one to five carbon atoms.

7. The process of claim 5, wherein in the urazole of the administered composition, $R_3$ is as defined in claim 1 and $R_1$ and $R_2$ are each alkyl of one to five carbon atoms.

8. The process of claim 5 in which the therapeutical composition is administered in dosage units each of which contains at least 0.5 mg. of the urazole compound.

9. The process of claim 5 in which the dosage unit administered contains 0.5–1.0 mg. of the urazole compound.

10. The process of claim 5 wherein $R_1$, $R_2$ and $R_3$ are each one alkyl of one to five carbon atoms.

* * * * *

UNITED STATES PATENT OFFICE
CERTIFICATE OF CORRECTION

Patent No. 3,621,099          Dated November 16, 1971

Inventor(s) Charles R. Jacobson, Anthony D'Adamo, Charlotte Cosgrove

It is certified that error appears in the above-identified patent and that said Letters Patent are hereby corrected as shown below:

Face of Patent should read as follows:

Continuation of Application Ser. No. 742,994, June 17, 1958.
This Application Mar. 5, 1969, Ser.No. 805,121

Signed and sealed this 25th day of July 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,621,099          Dated November 16, 1971

Inventor(s) Charles R. Jacobsen, Anthony D'Adamo, Charlotte Cosgrove

It is certified that error appears in the above-identified patent and that said Letters Patent are hereby corrected as shown below:

In Table I, the entry in the column headed "$R_3$" for Example 94 should read -- $C_2H_5$ --.

Signed and sealed this 9th day of April 1974.

(SEAL)
Attest:

EDWARD M. FLETCHER, JR.
Attesting Officer

C. MARSHALL DANN
Commissioner of Patents